Oct. 22, 1929.  R. DE BERSAQUES  1,732,794
DIRECTION SIGNAL
Filed March 26, 1925
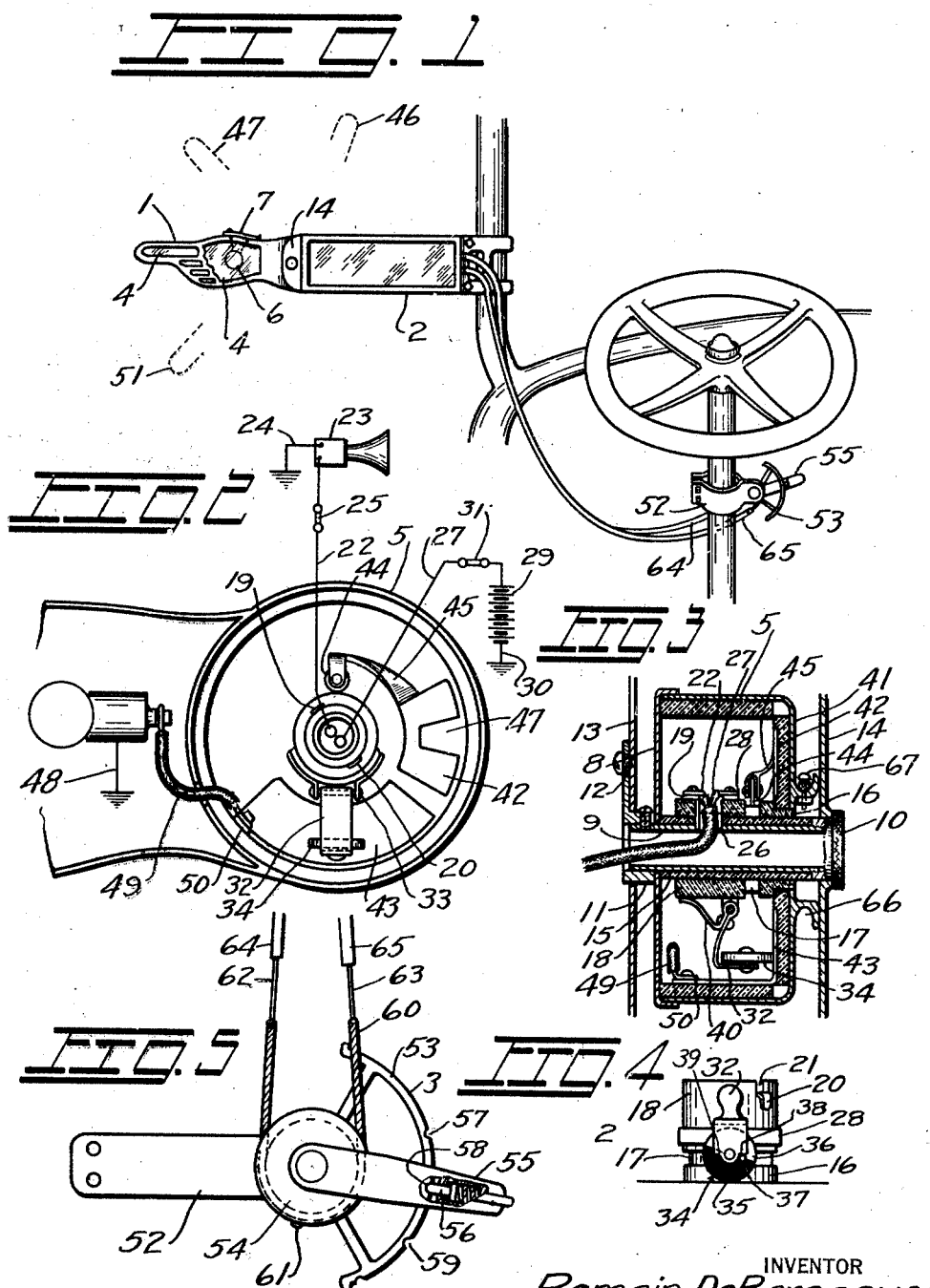

Patented Oct. 22, 1929

1,732,794

UNITED STATES PATENT OFFICE

ROMAIN DE BERSAQUES, OF SEATTLE, WASHINGTON

DIRECTION SIGNAL

Application filed March 26, 1925. Serial No. 18,397.

The invention is an auto signal having a mechanical hand foldable in a casing with a means for operating the same from a point adjacent the steering wheel and other means for sounding the horn as the device operates and for lighting a lamp in the hand as it moves outward.

The object of the invention is to provide a positive manually operated motor vehicle signal, which may readily be observed.

Another object of the invention is to provide a mechanical hand with means for operating it to indicate direction or stop signals.

Another object of the invention is to provide a manually operated signal which will automatically sound a horn as it operates.

Another object of the invention is to provide a manually operated signal which will automatically light a lamp therein as it operates.

And a further object of the invention is to provide a manually operated foldable hand for a motor vehicle signal, which automatically sounds the horn and lights a light as it moves outward.

With these ends in view the invention embodies a mechanical hand pivotally mounted in the end of a casing with means for operating the hand from a point adjacent the steering wheel and contact points adjacent the pivot of the hand for sounding the horn of the vehicle and lighting a lamp in the hand as the hand operates.

Other features and advantages of the invention will appear from the following description, taken in connection with the drawings, wherein:—

Figure 1 is a view showing the device as it may be attached to the frame of a motor vehicle wind shield.

Figure 2 is a view through the inner end of pivot end of the hand with the cover removed.

Figure 3 is a cross section through the pivot of the hand.

Figure 4 is a detail looking at the side of the large contact roller shown in Figures 2 and 3.

Figure 5 is a plan view of the operating lever that may be placed on the steering wheel post.

In the drawings I have shown my device as it would be constructed wherein numeral 1 indicates the hand, numeral 2 the casing in which the hand is supported and numeral 3 the operating bracket.

The hand 1 may be constructed of a thin casing with openings 4 indicating the fingers and body of a hand in both sides and may be provided with a hub 5 as shown at its inner end. It is understood that the openings 4 may be of any suitable shape and may be made in any suitable manner and may be covered with celluloid, glass or any suitable transparent or partially transparent material of any desired color. It is also understood that the hand 1 may be provided with flat sides as shown having a rectangular cross section or the cross section may be made to conform with the fingers of the hand or of any other suitable shape. A lamp 6 may be placed in the hand and an opening with a cover 7, to which the lamp bracket is attached, may be placed in one side so that the lamp will be accessible. The hub 5 may be made integral with the hand casing and provided with a cover 8 at one side so that the interior will be readily accessible.

The hub is mounted on a tubular sleeve 9, which is provided with a threaded cap 10 at one end and held in a hub 11 by a set screw at the other. The hub 11 is provided with a flange and the flange is provided with a slotted opening 12, through which it is held by a screw as shown in Figure 3, so that it is possible to adjust the position of the shaft and thereby adjust the position of the contact points to accelerate or retard the time at which the lamp is lighted or the segments operate in relation to the movement of the arm. The sleeve is thereby rigidly held in the walls 13 and 14 of the casing 2, and the plate 14 may be provided with a mirror as shown. On the sleeve 9 is an insulating sleeve 15 and at one end of this sleeve is an insulating bushing 16 with a metallic ring 17 next to it and another insulating bushing 18 next to the metallic ring. The metallic ring 17 has extensions 19 and 20 extending from it to notches 21 at the opposite end of the bushing 18, and one of the extensions is connected to a wire 22 as shown in Figure 3.

The opposite end of the wire 22 is connected to the horn of the motor vehicle which I have indicated by the numeral 23 and the opposite terminal of the horn is grounded to the frame of the vehicle by a wire 24 as shown in Figure 2. The wire 22 may be provided with a switch 25 so that the horn may or may not be used in combination with the signal as may be desired. It will be observed that the wire 22 extends from the point at which it is connected to the extension 19, through an opening 26 in the sleeve 9 into the interior of the sleeve and then out of the end of the sleeve from where it may be connected to the horn by any suitable means.

In combination with the wire 22 is another wire 27 which is connected to a metallic ring 28 on the bushing 18 as shown in Figures 3 and 4 and the opposite end of this wire is connected to the battery of the motor vehicle which is indicated by the numeral 29 and the battery is grounded through a wire 30. The wire 27 is also provided with a switch which is indicated by the numeral 31, and this switch may be arranged in combination with a switch 25 and placed on the instrument board of the vehicle or in any suitable position.

On the ring 28, which extends around the surface of the bushing 18 is a bracket 32 which is pivotally connected to it by a pin 33 and which has a roller 34 pivotally mounted in its outer end. The roller 34 is constructed in two halves one half being of an insulating material, as indicated by the numeral 35 and the other metallic, which is indicated by the numeral 36. The roller is also provided with a pin 37 as shown in Figure 4 which engages a shoulder 38 on one side of the bracket 32 when the roller is turned in one direction and the shoulder 39 on the opposite side of the bracket 32 when the roller is rotated in the opposite direction. This will permit the metallic surface of the roller to engage the surface upon which the roller rests when the device is moving in one direction or when the hand 1 is moving outward and the insulating surface of the roller to engage the surface when the device is moving in the opposite direction or when the hand is moving inward. The bracket 32 is provided with a spring member 40 that engages the opposite end of the bushing 18 and holds the roller against its bearing surface. The inner side of the hub 5 of the casing 1 is provided with an insulating disc 41 which has contact plates 42 and 43 inserted therein or attached thereto.

The contact plate 42, which operates the horn, is provided with a small roller 44 in a spring bracket 45, and is arranged so that the roller 44 engages the outer surface of the metallic ring 17, which is connected by the extension 19 to the horn as hereinbefore described. It will be observed that as the roller 34 engages the contact plate 42 a circuit will be completed from the battery 29 which is connected to the ground at one side, through the wire 27, the ring 28, the roller 34, the plate 42, the roller 44, the ring 17, the extension 19, the wire 22 and the horn 23 to the ground so that the horn will sound as the roller 34 engages the plate 42 as the hand 1 moves outward. The plate 42 is arranged so that the horn will sound as the hand 1 reaches the position indicated by dotted lines 46 shown in Figure 1, and by leaving a gap 47 in the plate 42, it will be seen that it will be possible to sound the horn twice as it passes over the plate 42.

As the hand continues to move outward and arrives at the position indicated at the dotted lines 47, the roller 34 will engage the plate 43 and complete a circuit which will light the lamp 6. The lamp being held in a socket in the casing is thereby grounded as indicated by the wire 48 and the opposite terminal is connected by a wire 49 to a projection 50 on the plate 43. The circuit through the lamp will then pass from the battery which is grounded through the wire 27 to the ring 28 and from the ring 28 through the roller 34, the plate 43, and the wire 49 to the lamp from where it will pass to the ground as hereinbefore described. As the plate 43 is continuous, this circuit through the lamp will remain completed as the hand passes from the position indicated by the dotted lines 47 to the position indicated by the dotted lines 51, shown in Figure 1, thereby keeping the lamp lighted while the hand 1 is in the upper position which will indicate that the car is about to turn to the right, while in the intermediate position shown in full lines to indicate that the car is about to turn to the left and also while in the dotted line position, pointing downward to indicate that the car is about to stop.

The hand 1 is operated from a point on the steering wheel by wire cables passing through small tubes and the cables are operated by a pulley in the bracket 3. The bracket 3 may be constructed as shown in Figures 1 and 5 with a clamp 52 for attaching it to the post of the steering wheel and a segmental member 53 rigidly attached to the bracket. A pulley 54 with a lever 55 is pivotally mounted on the bracket and the lever 55 is provided with a spring pin 56 which engages notches 57, 58 and 59 in the member 53 to hold the hand in the three signal positions. The notch 57 will hold the hand in the position indicated by the dotted lines 47, the notch 58 will hold the hand in the position indicated by full lines and the notch 59 will hold the hand in the position indicated by the dotted line 51.

Around the pulley 54 is a section of flexible cable which is indicated by the numeral 60 and which may be attached to the pulley by a screw 61. The inner ends of the operating wires, which are indicated by the numerals 62 and 63 are attached to the ends of this cable and pass through tubes 64 and 65. The opposite ends of the wires 62 and 63 are attached to another section of flexible cable or the like which passes around a pulley 66 on the hub 5 of the hand 1 and is attached to it by a screw 67 as shown in the section in Figure 3. The pulley 54 should normally be of about twice the diameter as the pulley 66 so that the lever 55 will only have to move a short distance in order to operate the hand 1. It will be understood that the hand 1 may be attached to the lever 55 and operated by it in any suitable manner and also that the tubes 64 and 65 containing the operating wires may also be located in any suitable position.

It will be understood that other changes may be made in the construction without departing from the spirit of the invention. One of which changes may be in the design of the hand, or in the casing in which the hand folds, another may be in the method of completing the circuits through the horn or light as the hand operates, and another may be in the use of any other suitable means for operating the hand.

The construction will be understood from the foregoing description. To use the device, the casing 2 may be attached to a motor vehicle windshield or to the side of a closed vehicle by any suitable bracket and the bracket 3 may be attached to the steering wheel post or to the interior of the vehicle at any point that is convenient to the operator, and it will be observed that as the operator desires to turn to the right or left, or to stop, he may readily operate the hand 1 and set it to the desired position. It will also be observed that as the hand moves outward, it will sound the horn as a warning and then light the lamp in the casing. It will also be observed that the operator may, at his discretion eliminate the sounding of the horn or the lighting of the lamp by the switches in the circuits.

The halved roller 34 is so arranged that as soon as the device is moved backward, even a very small amount the light or circuit will be broken.

Having thus fully described the invention, what I claim as new and desire to secure by Letters Patent, is:—

In a signal of the character described, a stationary tubular shaft, a contact ring on the said shaft having a plurality of contact points positioned therein, a movable hub on the said shaft surrounding the said contact points, a plurality of segments in one end of the said hub and insulated therefrom, an arm having a roller in the end thereof attached to and extending from one of the said segments, said roller engaging the outer surface of the contact ring on the said shaft, a resilient arm having a roller in the outer end thereof mounted upon the said stationary shaft, said resilient arm being positioned to enable the roller therein to engage the segments in the said hub, said roller having a non-conducting section therein for automatically breaking the circuit through the said rollers and contact points as the said hub rotates in a reverse direction, a suitable signal arm having openings in the sides thereof extending outward from the said hub and rotating therewith, a lamp positioned in the said signal arm, means connecting the lamp to segments in the said drum, a horn positioned at a remote point, suitable connections from the horn through the segments in the drum to complete circuits through the horn as the signal arm is operated, means for operating the said arm from a remote point, and suitable circuits connecting the said rollers, contact points, segments and indicating devices to a supply of current.

ROMAIN DE BERSAQUES.